(12) United States Patent
Araya

(10) Patent No.: US 6,259,078 B1
(45) Date of Patent: Jul. 10, 2001

(54) METHOD FOR MICROWAVE DRYING OF CERAMICS

(75) Inventor: Carlos R. Araya, Woodhull, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/608,849

(22) Filed: Jun. 30, 2000

Related U.S. Application Data

(60) Provisional application No. 60/142,610, filed on Jul. 7, 1999.

(51) Int. Cl.[7] .................................................. H05B 6/68
(52) U.S. Cl. ........................... 219/709; 219/696; 34/259
(58) Field of Search .................................. 219/709, 702, 219/704, 705, 698, 700, 696; 34/259, 263, 264, 265

(56) References Cited

U.S. PATENT DOCUMENTS

| | | | |
|---|---|---|---|
| 4,771,153 | 9/1988 | Fukushima et al. | 219/709 |
| 5,365,043 | 11/1994 | Bradford | 219/710 |
| 5,521,360 | 5/1996 | Johnson et al. | 219/709 |
| 5,837,978 | 11/1998 | Hatzakis, Jr. et al. | 219/702 |
| 6,025,580 | 2/2000 | Yagi | 219/709 |

FOREIGN PATENT DOCUMENTS

| | | |
|---|---|---|
| 44 29 074 | * 2/1996 | (DE) . |
| WO 93/12629 | 6/1993 | (WO) . |
| WO 97/44626 | 11/1997 | (WO) . |
| WO 98/10747 | 1/1998 | (WO) . |

* cited by examiner

*Primary Examiner*—Philip H. Leung
(74) *Attorney, Agent, or Firm*—Timothy M. Schaeberle

(57) ABSTRACT

The invention is directed at apparatus for microwave heating of a ceramic, comprising an adjustable power microwave source for directing microwave power into a continuous throughput microwave cavity. The apparatus further includes a microwave power control system for variably controlling the power of that is delivered to the microwave cavity. The first component of this system comprises a reflected power detector for detecting the microwave power reflected from the ceramic material in the cavity. The reflected power detector measures the value of the reflected power from the cavity and compares that reflected power output value to a preset reflected output value to generate an output signal indicative of the difference in measured and set reflected values. The second component of this system comprises a microwave controller that receives the output signal from the reflected power detector controller and adjusts the power of the adjustable microwave so that the reflected power output signal is maintained at or near the preset output signal value.

9 Claims, 2 Drawing Sheets

METHOD FOR MICROWAVE DRYING OF CERAMICS

This application claims the benefit of U.S. Provisional Application No. 60/142,610, filed Jul. 7, 1999, entitled "Method for Microwave Drying of Ceramics", by Carlos R. Araya.

BACKGROUND OF THE INVENTION

1. Field of the Invention

The invention relates to method for manufacturing ceramic materials. In particular, this invention relates to a method for microwave heating and drying ceramics, and more particularly to a method for variably and efficiently controlling the power and the heating/drying rate.

2. Discussion of the Related Art

Conventional heating or drying typically comprising convectional or a combination of convectional and radiative gas or electric resistance heating, is commonly used in the manufacturing of ceramic materials. However, the slow heating rate and poor temperature control associated with these conventional heating methods results in a high energy consumption and inconsistent product quality. Furthermore, utilization of these two modes of heating typically result in thermal differences within the ceramic body, due to the fact that these two heating modes are applied only to the surface and rely on thermal conductivity of the ceramic body to effect the temperature beneath the surface to the center of the piece.

Industrial heating by microwave radiation has been successfully used to accelerate the drying of traditional ceramics. In comparison with convectional heating, microwave heating provides a higher heating rate, where there is sufficient absorbtion, with better temperature control, and thus results in lower energy consumption and potentially better quality products. Furthermore, the utilization of microwave energy delivers a uniform application of the energy to the ceramic article, rather than to the article surface, as is the case for the aforementioned convectional and radiative modes of heating. Lastly, microwave heating is much faster than conventional drying because the ceramic body is heated directly through the interaction of the microwave energy with the ceramic body.

Although microwave heating is faster and more efficient than conventional modes such as convectional and radiative heating, standard microwave heating typically involved controlling the amount of microwave energy utilizing a constant power setpoint to determine the amount of microwave to which the ceramic body is subject to. Typically, this power output is set at some value such that ensures that the reflected power never exceeds the manufacturers specification; i.e., a power output assuming a constant load and material dielectric characteristics. The unfortunate result of utilizing this conventional method of controlling microwave heating is that any variation in the amount of mass of material in the microwave (loading) or variations in the dielectric characteristics of the load or variations in geometries and densities (i.e., varying heights or lengths), are not compensated for. As a result, the microwave heating is inefficient because the power input at various times during heating is far below that which the ceramic load is capable of handling. This inefficiency forces current drying processes to be tailored to the capabilities of the drying equipment; i.e., increasing residence/drying time of the article to be dried, thereby limiting the throughput of the material to be dried and, in many cases producing defects in the material being processed. In sum, conventional control of microwave drying forces the equipment to be utilized at power levels that are either inefficient or result in shortened magnetron tube life due to the operation in high ranges of reflected power.

PCT Application WO 93/12629 discloses a method of preventing thermal runaway and increasing microwave efficiency in the heating of ceramic materials. Provided therein is an apparatus that includes a microwave resonant cavity, a magnetron for generating microwaves and a means for continuously controlling the power of the magnetron, with the means comprising a temperature control system, specifically an optical fibre pyrometry system, and a solid state control circuit. This "means for controlling the microwave power" controls the power of the magnetron in response to any difference between a set value of the temperature of the ceramic items and a measured value of the of ceramic items temperature. Although this apparatus is capable of providing a variable power source of microwave energy in response to a temperature parameter and thus control the temperature of the ceramic to prevent thermal runaway, it is still deficient. Specifically, the use of a temperature control system utilizing optical fibre pyrometry measures only the external surface temperature of the ceramic and is not capable of measuring the temperature of the ceramic core. As such, high delta temperatures develop between the skin and core of the piece, ultimately producing stresses in the product which result in uneven drying and potential defects such as cracking, blistering and/or fissuring

SUMMARY OF THE INVENTION

Accordingly it is an object of this invention to provide an apparatus for, and a method of, efficiently and effectively microwave heating ceramics that overcomes the shortcomings of convectional and radiative heating, as well as those of conventional microwave heating.

A first aspect of the invention is provided in an apparatus for microwave heating of a ceramic, comprising an adjustable power microwave source for directing microwave power into a continuous throughput microwave cavity. The apparatus further includes a microwave power control system for variably controlling the power of that is delivered to the microwave cavity. The first component of this system comprises a reflected power detector for detecting the microwave power reflected from the ceramic material in the cavity. The reflected power detector measures the value of the reflected power from the cavity and compares that reflected power output value to a preset reflected output value to generate an output signal indicative of the difference in measured and set reflected values. The second component of this system comprises a microwave controller that receives the output signal from the reflected power detector controller and adjusts the power of the adjustable microwave so that the reflected power output signal is maintained at or near the preset output signal value.

A second aspect of the invention involves a method for drying a ceramic material comprising placing the ceramic material in a microwave heating apparatus having a continuous throughput microwave cavity and subjecting the ceramic material to an predetermined initial amount of heat energy by irradiating it with electromagnetic microwave radiation from an adjustable microwave power source. The method further involves continuously measuring a reflected power output signal of the ceramic material contained within the microwave cavity and continuously controlling the amount of microwave radiation to which the ceramic material is subject to such that the resultant reflected power output signal is maintained at a preset reflected power value.

DETAILED DESCRIPTION OF THE INVENTION

Figure 1:
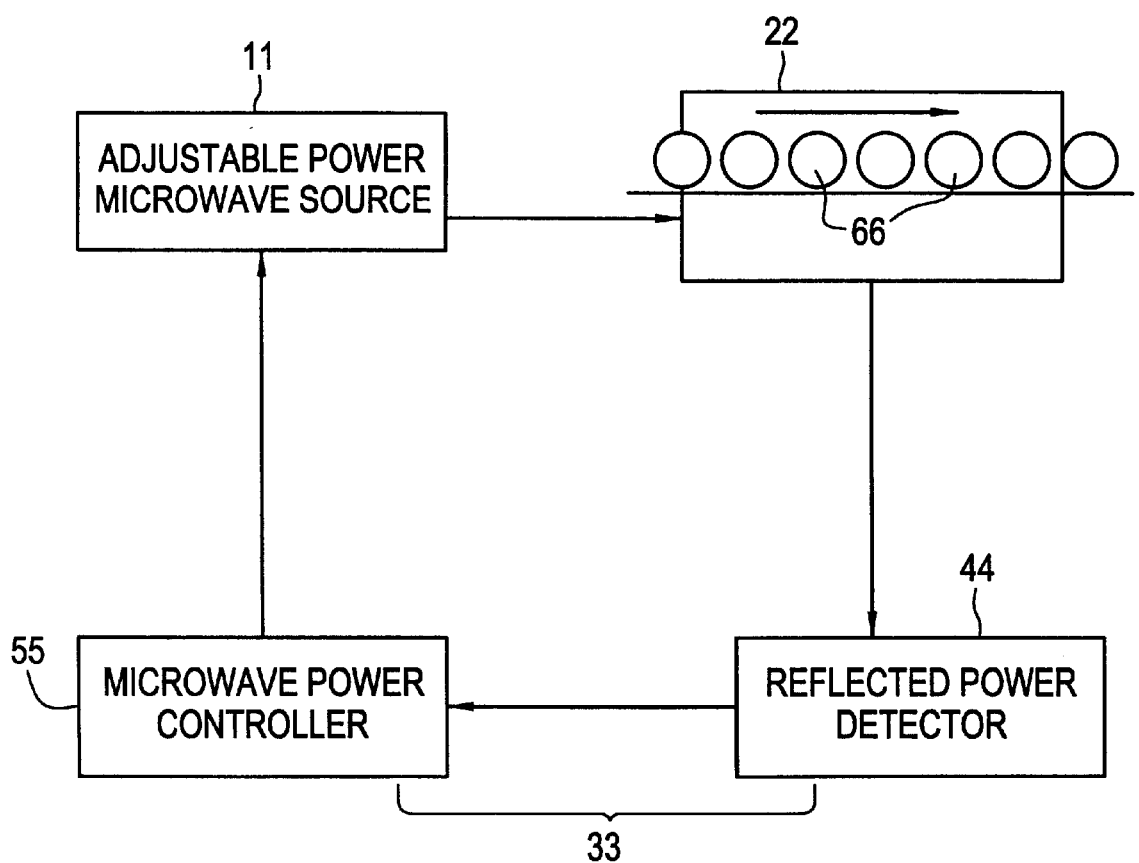
FIG. 1 is a block diagram of an apparatus illustrating one embodiment of the invention.

Referring to FIG. 1, there is shown a heating apparatus according to the invention described herein. This apparatus comprises an adjustable microwave generator or source 11, coupled directly or indirectly, to a cavity resonator or microwave heating chamber 22, and a microwave power control system 33 for continuously controlling and adjusting the microwave power. This control system 33 consists of a reflected power detector 44, and a microwave power controller 55 having a solid state control circuit. The cavity resonator 22 is configured such that a mass of ceramic 66 is capable of continuously passing though the inside of the resonator as it is heated and dried; i.e., a continuous throughput microwave cavity.

In a preferred embodiment, the cavity resonator or heating chamber is multimodal, namely it will support a large number of resonant modes in a given frequency range, and in a more preferred embodiment the heating chamber includes a mode stirrer to provide greater uniformity of electric field distribution within the microwave heating chamber. Furthermore, the aforementioned cavity resonator or microwave heating chamber and power control system is preferably part of an overall drying apparatus like that described in greater detail in copending, co-assigned application, U.S. patent application Ser. No. 60/142,609 filed Jul. 7, 1999.

In the operation of the apparatus constructed as described above, microwave power enters the cavity resonator 22 to heat the mass of ceramic 66 that is passing through the cavity resonator 22. This heating/drying of the ceramic changes the dielectric properties of the ceramic in the cavity resonator. Generally, as specialty ceramics such as cordierite and/or mullite, et al., are heated, their specific dielectric constants and dielectric loss factors increase. Specifically, as the ceramic bodies are dried, they lose water and increase in temperature. Furthermore, the total mass (i.e. density) of ceramic material within the cavity resonator varies (increases and/decreases) as ceramic articles enter and leave the resonator. These two factors combine to cause variability in the specific dielectric constant (i.e., the dielectric loss factor) of the mass of ceramic in the cavity resonator. A direct result in the variability of the dielectric characteristics of the ceramic in the cavity resonator is the variability in the amount of microwave power that is absorbed, and thus reflected power given off by the ceramic mass within the cavity generator varies. The direct result of this variability is that correspondingly the power of the microwaves that can be delivered to the cavity may be varied as well. In other words, reflected power signal becomes, in effect, a signature of the status of the overall density, dielectric constant and, loss factor of a continuously varying load.

Accordingly, the apparatus constituting the first aspect of the invention further included the aforementioned microwave power control system 33 consisting of the reflected power detector 44 and a microwave power controller 55. As microwave power is caused to enter the cavity 22 to heat the ceramic material 66, the state of the heated ceramic placed in the resonator is measured, specifically, the amount of microwaves reflected is detected by the reflected power detector 33. The reflected power value is fed to a computer, either incorporated within or in communication with the reflected power detector, that compares the measured reflected power value to a preset reflected power value to generate a output control signal, if a difference is calculated between the measured reflected power signal and the preset reflected power value. Specifically, reflected power detector comprises a directional coupler that detects the reflected power signal via a waveguide coupled to the cavity. The directional coupler transmits a 0–1ma signal to a transducer that transforms the signal to 4–20 ma for processing by the programmable logic controller or computer.

An electronic circuit within the microwave controller 55 containing one of more solid state devices achieves the desired control of the power of the microwave energy delivered to the microwave cavity. In one embodiment the solid state device within the microwave controller 55 is an SCR control circuit (not shown) capable of controlling the voltage supply to the magnetron. The output control signal, if present due to a difference between the measured and preset values, is delivered to the microwave controller's SCR Control. The SCR control circuit adjusts the voltage of the of the adjustable microwave source 11 according to the signal applied from the reflector detector 44. Since energy radiated by the adjustable microwave power source 11, or magnetron, is converted indirectly to reflected power of the ceramic mass within the cavity 11, a change in energy generated by the magnetron causes an instantaneous change in the reflected power generated by the mass of ceramic 66 within the cavity 22. Thus, by varying the voltage supply to the magnetron, the magnetron effectively provides a variable power source of microwave energy, so that the reflected power of the ceramic mass within the cavity at any given time is maintained at the preset reflected microwave power value.

In a preferred embodiment the reflected power signal value is compared to a preset reflected output signal comprising an upper and lower preset value. In this embodiment the microwave power controller adjusts the power of the microwave so that the reflected power output signal is maintained between a range comprising an upper and lower preset output signal value. In either embodiment, the reflected value preset value or range should be a value of approximately 10% of the total power output of the tube/magnetron utilized in the apparatus; this is the typical/standard safe amount as specified by microwave manufacturers. In a standard microwave/magnetron this preset value/range should be between 1.5 to 2.5 kW.

The microwave source employed to generate the microwaves can comprise any conventional magnetron with an adjustable power feature. Preferably, the frequency of incident microwave used should be greater than about 1 GHz, more preferably the frequency used is between the range of between about 1 GHz and 2.45 GHz, which is the designated industrial band in the United States. In other countries, other wavelengths could be utilized from 100 to 10,000 MHz. Furthermore, the power of the incident microwave need be no greater than that sufficient to, as described above, raise the temperature of the ceramic article to a temperature effective for drying the ceramic article. Specifically, the microwave power source should possess variable power levels ranging between 1 to 75 kW. Magnetrons of this type can generate sufficient heat within the body to raise the temperature rapidly to the drying level e.g. up to about 150° C. in as little as 1 to 10 minutes.

Figure 2:
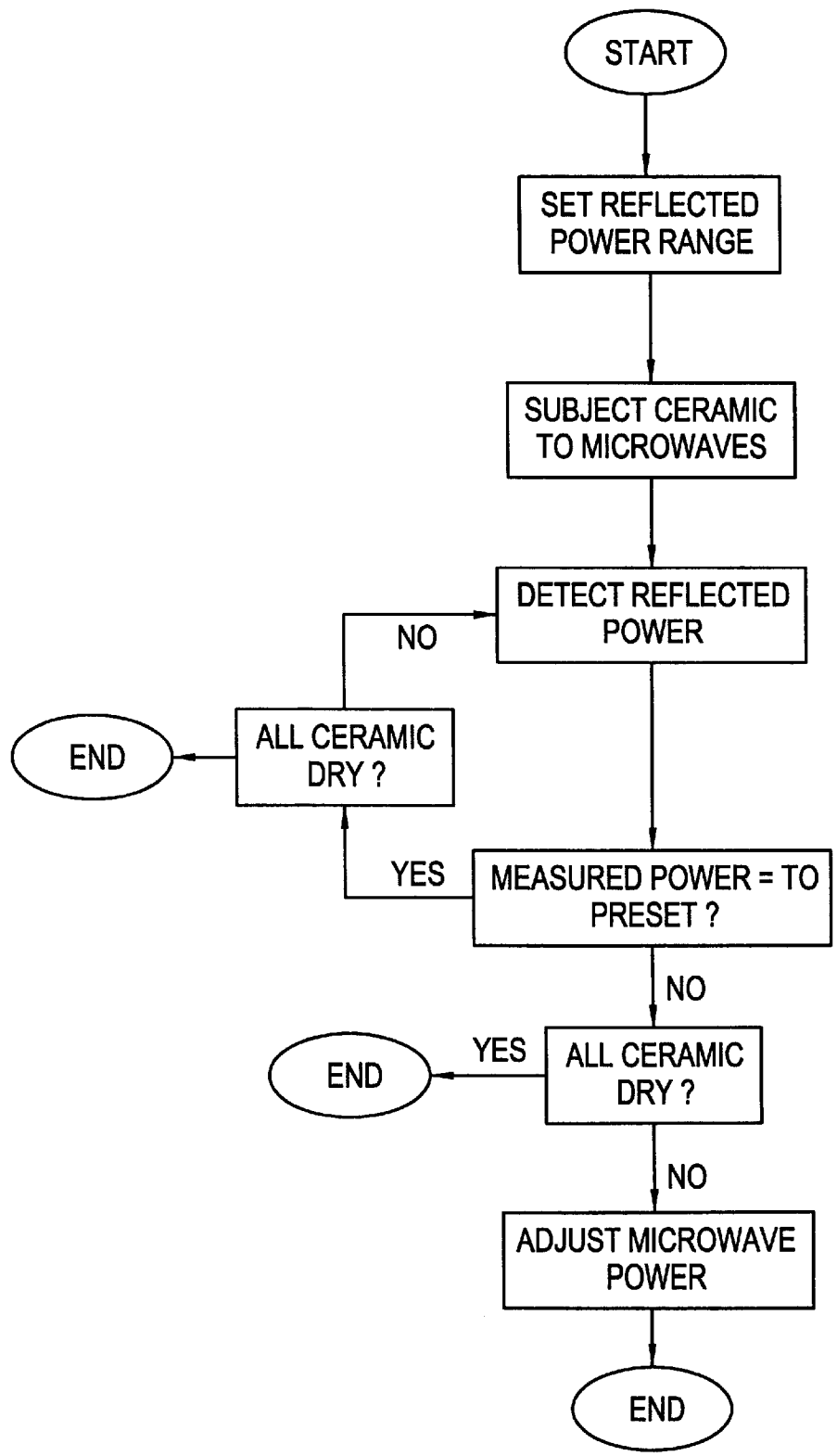
FIG. 2 is a flowchart illustrative of the inventive drying method described herein.

FIG. 2 is flowchart for illustrating the method of drying a ceramic material. Initially the method involves subjecting the ceramic material to a predetermined initial amount of heat energy by irradiating it with electromagnetic microwave radiation from an adjustable microwave power source. The initial amount of heat energy that the ceramic should be subject to should be an amount of microwave radiation sufficient to raise the temperature of the ceramic article to a temperature effective for drying the ceramic article within a reasonable time period. As the ceramic bodies are heated the method involves continuously measuring the reflected power output signal of the ceramic material and continuously controlling the amount of microwave radiation so that the reflected power output signal is maintained at a preset reflected power value. The method continues until the last ceramic body that has entered the cavity has proceeded through the dryer and has been dried.

It is within the knowledge of one skilled in the art the amount of microwave radiation necessary to dry the article within a reasonable amount of time; i.e., a reasonable drying cycle for each ceramic body. Factors including the ceramic composition, geometry of the ceramic body, capabilities of the dryer should be considered in setting up the parameters of the drying process sufficient to achieve a reasonable drying cycle. For example, the drying cycle for a cylindrical thin-wall ceramic body exhibiting a 7 in. length, a diameter of 3.866 in. and possessing a 2.0 mil cell well thickness and 900 cell/in$^2$ involves subjecting the body to microwave radiation delivered at an initial power of 50 kW, ranging between 35 and 60 kW, and frequency of 915 MHz for a period not to exceed 5 minutes.

The method described herein is particularly suitable for use in the drying thinwall ceramic bodies. Drying as used herein refers to a reduction in the liquid content of the body to a desired value, preferably, the drying is carried out to a degree where the ceramic article can be handled without causing any damage thereto or unacceptable deformation thereof. For example, ceramic articles of the thin wall cylindrical body type, a dried article, sufficiently dry for handling purposes, is a ceramic article having less than 5% of its original green state water, and preferably less than 1%.

While there is shown and described the present preferred embodiment of the invention, it is to be distinctly understood that this invention is not limited thereto but may be variously embodied to practice within the scope of the following claims.

It should be understood that while the present invention has been described in detail with respect to certain illustrative and specific embodiments thereof, it should not be considered limited to such, as numerous modifications are possible without departing from the broad spirit and scope of the present invention as defined in the appended claims.

I claim:

1. An apparatus for microwave drying of a ceramic, comprising
   a microwave cavity in which a ceramic is placed and dried;
   an adjustable power microwave source for directing microwave power into the microwave cavity;
   a microwave power control system comprising:
   (1) a reflected power detector for detecting the microwave power reflected from the cavity and for comparing the measured reflected microwave power value to a preset reflected microwave power output value which comprises an upper and lower preset value and encompasses a value that is approximately 10% of the total maximum power output of the adjustable microwave power source, and producing an output signal indicative of the difference between the measured reflected power value and the preset reflected microwave power value; and,
   (2) a microwave power controller that receives the output signal from the reflected power detector and adjusts the power of the microwave so that the reflected power output signal is maintained between the upper and lower preset reflected microwave power value encompassing approximately 10% of the total maximum power output of the adjustable microwave power source.

2. The apparatus according to claim 1 wherein the microwave cavity is a continuous throughput cavity.

3. A method for drying a ceramic material comprising:
   placing the ceramic material in a microwave heating apparatus having a microwave cavity and subjecting the ceramic material to an predetermined initial amount of heat energy by irradiating it with electromagnetic microwave radiation from an adjustable microwave power source, the initial amount of heat energy being an amount of microwave radiation sufficient to raise the temperature of the ceramic article to a temperature effective for drying the ceramic article;
   continuously measuring a reflected microwave power value of the ceramic material and continuously controlling the amount of microwave radiation so that the measured reflected microwave power value is maintained at a preset reflected microwave power value, the preset reflected power value comprising a range between an upper and lower preset reflected microwave power value and encompassing a value that is approximately 10% of the total maximum power output of the adjustable microwave power source.

4. A method in accordance with claim 3 wherein the microwave is a continuous throughput microwave.

5. A method in accordance with claim 3 wherein the ceramic article is irradiated for a period of time sufficient to dry the article whereby at least about 95% of its green state water is removed.

6. A method in accordance with claim 3 wherein the ceramic article irradiated for a period of time sufficient to dry the article whereby at least about 99% of its green state water is removed.

7. A method in accordance with claim 3 wherein the maximum power of the adjustable power microwave source is greater than about 1 kW but less than about 75 kW.

8. A method in accordance with claim 3 wherein the frequency of microwave energy to which the ceramic article is subject to is greater than about 1.0 GHz.

9. A method in accordance with claim 3 wherein the frequency of microwave energy to which the ceramic article is subject to is a about 2.45 GHz.

* * * * *